United States Patent [19]

Bower, Jr.

[11] Patent Number: 4,501,533

[45] Date of Patent: Feb. 26, 1985

[54] APPARATUS FOR DELIVERING LIQUID UNDER PRESSURE

[76] Inventor: Frank A. Bower, Jr., 3903 W. Dakin, Chicago, Ill. 60618

[21] Appl. No.: 94,486

[22] Filed: Nov. 15, 1979

[51] Int. Cl.[3] ........................ F04B 35/02; B67D 5/06; B65D 6/18; F16K 51/00

[52] U.S. Cl. .................................... 417/388; 222/183; 251/144; 220/6

[58] Field of Search ........................ 417/383, 387, 388; 222/183; 251/144; 220/6

[56] References Cited

U.S. PATENT DOCUMENTS

| | | | |
|---|---|---|---|
| 2,960,936 | 11/1960 | Dean et al. | 417/387 |
| 3,191,810 | 6/1965 | Johnston | 222/183 |
| 3,223,117 | 12/1965 | Curie et al. | 251/144 |
| 3,254,845 | 6/1966 | Schlosser | 417/388 |
| 3,317,141 | 5/1967 | Mann | 417/388 |
| 3,367,270 | 2/1968 | Schlosser | 417/388 |
| 3,414,156 | 12/1968 | Felldin | 220/6 |
| 3,612,727 | 12/1971 | Drake | 417/388 |
| 4,184,809 | 1/1980 | Kelley | 417/388 |

FOREIGN PATENT DOCUMENTS

| | | | |
|---|---|---|---|
| 1241558 | 8/1960 | Fed. Rep. of Germany | 220/6 |
| 14910 | of 1915 | United Kingdom | 239/302 |
| 963520 | 7/1964 | United Kingdom | 220/6 |

*Primary Examiner*—William L. Freeh
*Attorney, Agent, or Firm*—Anthony S. Zummer

[57] ABSTRACT

The present invention relates to an apparatus for delivering a stream of liquid material under pressure. The apparatus includes a base having a motor mounted thereon. A diaphragm pump is mounted on the base and is connected to the motor by a drive assembly. The diaphragm pump has a reservoir tank connected to it. A circulatory system circulates a pump liquid between the pump and the reservoir tank. An air check valve is connected to the circulatory system to allow air to be introduced into the circulatory system when the liquid material is prevented from being pumped out of the diaphragm pump. A collapsible container support is mounted on the base. A liquid material container is removably mounted in the container support for storing a liquid material prior to delivery to the diaphragm pump.

28 Claims, 11 Drawing Figures

FIG. 1
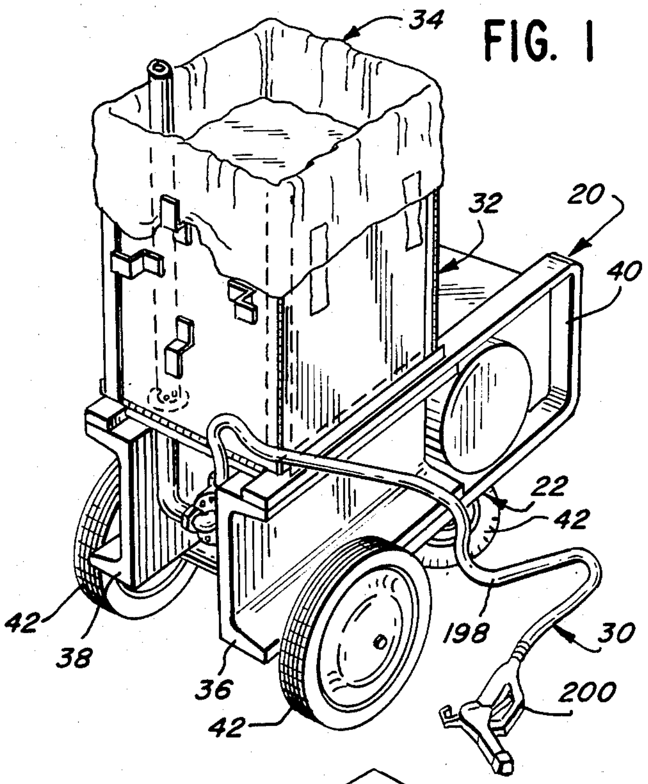
FIG. 2
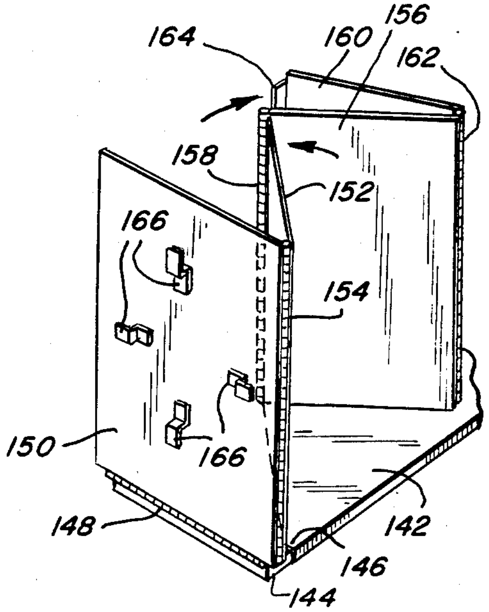
FIG. 3
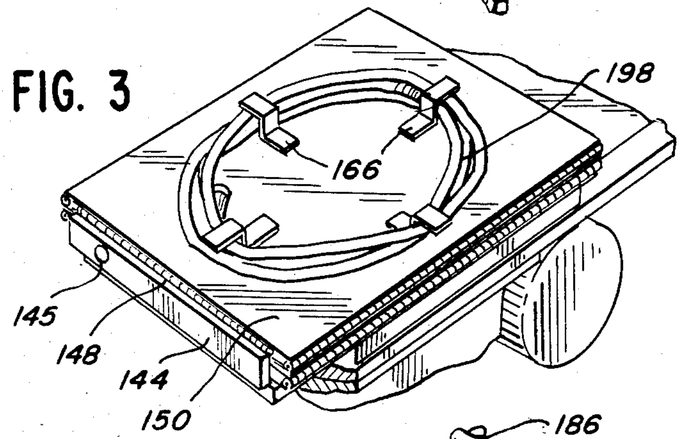
FIG. 4
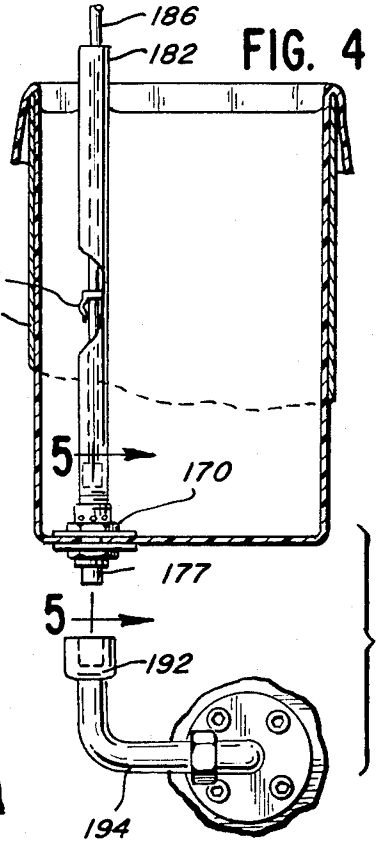
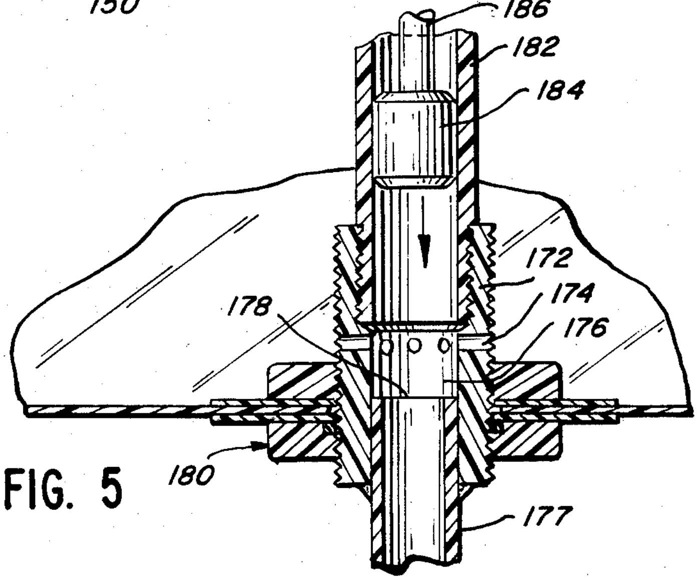
FIG. 5

FIG. 6
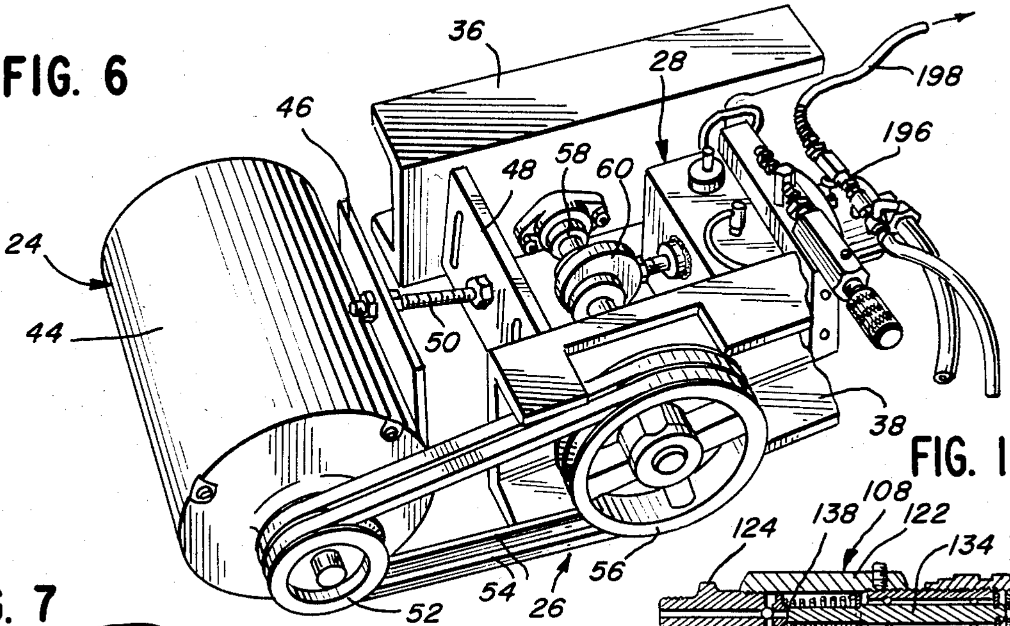
FIG. 11
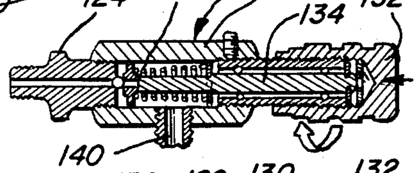
FIG. 7
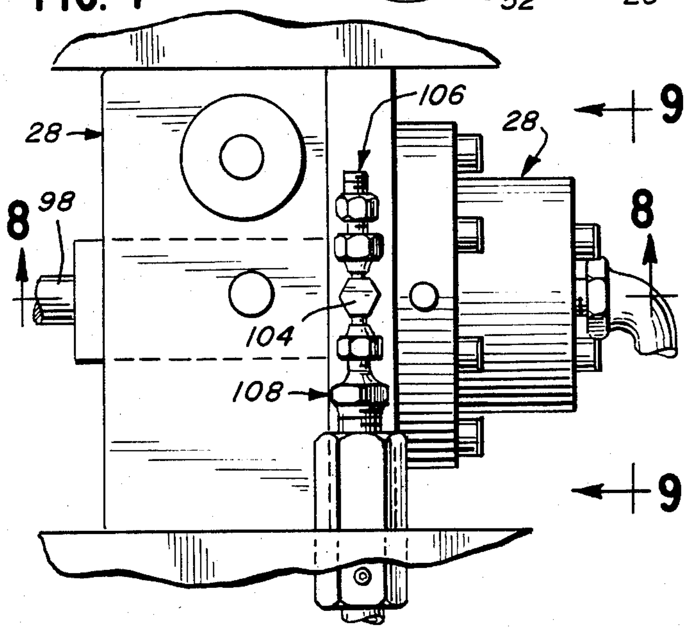
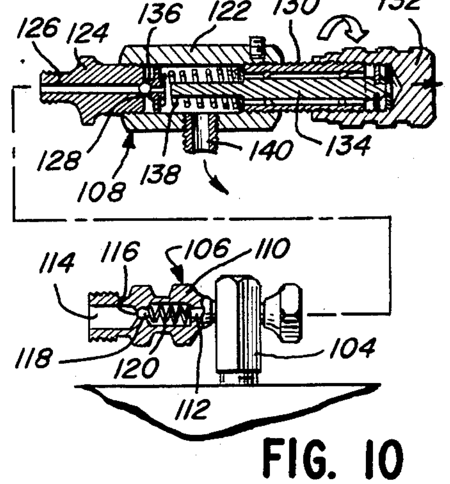
FIG. 10
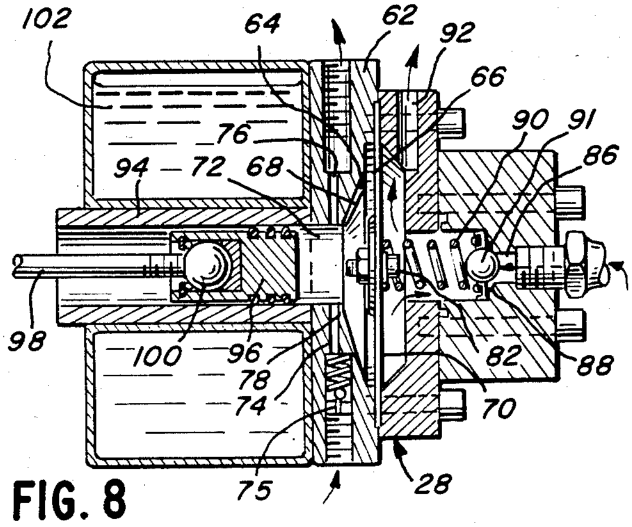
FIG. 8
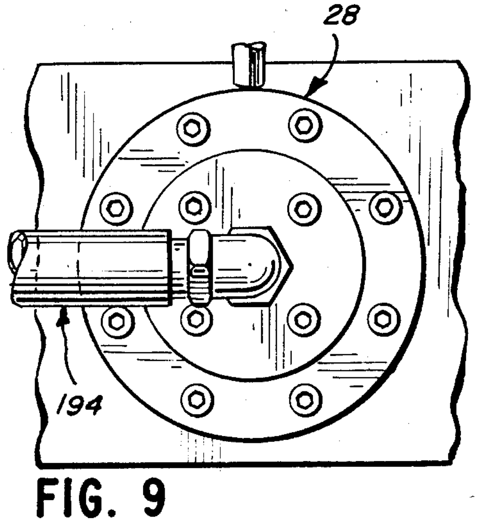
FIG. 9

APPARATUS FOR DELIVERING LIQUID UNDER PRESSURE

BACKGROUND OF THE INVENTION

Spray painting has become widely accepted as an efficient means of applying paint to a surface in many applications. The utilization of spray painting has found wide acceptance in the manufacturing industry for all types of goods. The advantages of spray painting are recognized for other applications such as painting building structures, or other large pieces of equipment which are built on site or even in the repair of large pieces of equipment in the field. In order to accomplish spray painting, it is necessary to provide a suitable apparatus for pumping liquid paint at a high pressure.

The utilization of diaphragm pumps for a portable spray painter has been recognized heretofore. The portable spray painters have encountered certain problems, one of which is the over heating of oil which is the pump liquid in the diaphragm pump when the painter stops spraying, but the pump continues to operate. Furthermore, the portable spray painters have been heretofore of a large size to accommodate a container for the paint and a reservoir for the pump oil. In addition, it has been found necessary to be able to make a quick change of paint color, or type of paint, in certain instances. The known construction of the portable spray painters have not provided for an easy change from one color to another, or one material to another.

SUMMARY OF THE INVENTION

The instant invention relates to an apparatus for delivering under pressure a liquid material, such as paint. The apparatus has a base mounted on wheels. An electric motor which provides a source of mechanical energy is mounted on the base. A diaphragm pump is also mounted on the base and is connected to the electric motor through a drive assembly. The diaphragm pump includes an annular reservoir tank for holding a pump liquid. A pump cylinder is mounted in a central aperture portion of the annular reservoir tank. A pump piston is reciprocably mounted in the cylinder and is connected to the drive assembly. A housing is connected to the cylinder. A diaphragm is movably mounted in the housing dividing the housing into two principal chambers. The housing has an inlet aperture opening into one of the chambers. A check valve is connected to the inlet aperture to prevent the flow of liquid material out of its respective chamber through the inlet aperture. A circulatory system is connected to the cylinder and the reservoir tank for circulating pump liquid between the cylinder and the reservoir tank. An air check valve is connected to the circulatory system to allow air to be pulled into the circulatory system when liquid material is prevented from being expelled from its respective chamber. A collapsible container support is hingedly mounted on the base. A removable container is mounted in the container support. The removable container includes a valve seat mounted at the bottom of the container. A valve tube is connected to the valve seat and extends exteriorly to the container. A valve body is movably mounted in the valve tube and is removably engageable with the valve seat for control of flow of liquid material from the container. A valve stem is connected to the body and extends exteriorly of the container through the valve tube to operate the valve body.

BRIEF DESCRIPTION OF DRAWINGS

FIG. 1 is a perspective view of a spray paint apparatus embodying the herein disclosed invention;

FIG. 2 is a perspective view of a portion of the apparatus of FIG. 1 and in particular being a collapsible container support showing the support in a partially erected attitude;

FIG. 3 is a fragmentary perspective view of the container support shown in FIG. 2 with the support in its stored attitude showing a hose rack on one panel support with a hose mounted threon;

FIG. 4 is a cross-sectional view of the container of the present invention showing the container in engagement with a fragmentary portion of the container support and also showing a nipple receptacle.

FIG. 5 is an enlarged cross-sectional view of a valve which is a portion of the container of FIG. 4 which cross-sectional view is taken on line 5—5 of FIG. 4;

FIG. 6 is a perspective view of a portion of the spray apparatus shown in FIG. 1 but with the container support being removed in order to show the interior portion of the apparatus;

FIG. 7 is a plan view of a diaphragm pump;

FIG. 8 is a cross-sectional view of the diaphragm pump of FIG. 7 taken on line 8—8 of FIG. 7.

FIG. 9 is a side elevational view taken on line 9—9 of FIG. 7;

FIG. 10 is a partial diagrammatic view of a portion of a circulatory system showing the interior construction of an adjustment valve and an air relief check valve; and FIG. 11 is a cross-sectional view of an adjustment valve showing the adjustment valve in a substantially closed attitude.

DESCRIPTION OF THE PREFERRED EMBODIMENT

Referring now to the drawings and especially to FIG. 1, a paint spraying apparatus embodying the herein disclosed invention is shown therein and generally indicated number 20. Referring now to FIG. 6, as well as FIG. 1, it may be seen that apparatus 20 generally includes a base 22 and an electric motor assembly 24 mounted on the base. A drive assembly 26, which is mounted on the base, drivingly connects motor assembly 24 to an improved diaphragm pump 28. A conventional spraying assembly 30 is connected to the diaphragm pump. A collapsible container support 32 is mounted on the base and has an improved container 34 mounted therein connected to the diaphragm pump.

Base 22 includes a pair of steel channels 36 and 38 which are connected to each other. Each of the channels has a bracket 40 mounted thereon. A plurality of wheels 42 supports the steel channels 36 and 38.

Electric motor assembly 24 includes a conventional electric motor 44 secured to a mounting plate 46. Mounting plate 46 is hingedly connected to the base. A fixed motor plate 48 is mounted on base 22 between channels 36 and 38. A conventional threaded stud 50 connects the plates 46 and 48 to allow the electric motor to be positioned relative to the base for adjusting the tension in the drive assembly. The electric motor has a pulley 52 connected to an output shaft to provide an output from the motor for connection to the drive assembly.

The drive assembly includes a pair of belts 54 which are mounted on pulley 52 and drivingly engage a sheave 56 which in turn is mounted on a drive shaft 58. Drive shaft 58 is rotatably supported on channels 36 and 38 by conventional bearings. A cam 60 is mounted on the shaft 58 and is drivingly connected to diaphragm pump 28.

The diaphragm pump includes a housing 62. Housing 62 has a cavity 64 contained therein. A diaphragm 66 is mounted in the housing with the outer periphery of the diaphragm in sealing engagement with the housing to divide chamber 64 into a pump liquid chamber 68 and a liquid material chamber 70. Chamber 68 contains a central passage 72. A pump liquid inlet port 74 extends through the housing and into communication with the central passage 72. A conventional ball check valve 75 is mounted in inlet port 74 to provide one way flow through the port. Housing 62 also contains a pump liquid outlet port 76. As may be best seen in FIG. 8, cavity 64 is partially dished and has a flat diaphragm surface 78 surrounding central passage 72. Diaphragm 66 includes a metal sealing plate 80 mounted on the central portion of the diaphragm for engagement with surface 78. Plate 80 is held onto the diaphragm 66 by a diaphragm plate fastening assembly 82.

Chamber 70 includes a valve recess 84 and communicates with a liquid material inlet aperture 86. A ball check assembly 88 is mounted in the valve recess 84 to close off selectively the inlet aperture. The ball check assembly includes a ball check spring 90 which is in engagement with plate fastening assembly 82 and a conventional ball 91 which seats in the inlet aperture. The housing includes a liquid material outlet port 92 which opens into chamber 70.

A pump cylinder 94 is connected to housing 92 and is in direct communication with central passage 72. A pump piston 96 is reciprocably mounted in cylinder 94. The piston is connected to a piston rod 98 through a ball joint 100. Rod 98 engages the cam 60. An annular pump reservoir tank 102 having a central open portion is connected to the housing 62. Cylinder 94 is mounted in the central open portion of the reservoir tank so that the tank surrounds cylinder 94.

Pump cylinder 94 is connected to a circulatory system which carries a pump liquid from pump cylinder 94 to reservoir tank 102 and the pump liquid is returned to the cylinder. The cirulatory system includes a tee 104 which is connected to outlet port 76. The tee has one side connected to an air check valve 106 and the other side to an adjustment valve 108. The air check valve 106 includes a valve body 110 which has a central aperture 112. An inlet aperture 114 opens to the atmosphere with an annular valve seat constriction 116 being positioned at the end of aperture 114. A ball 118 is mounted in engagement with the valve seat 116 and the ball is held in place by a spring 120. The spring regulates the flow of air into the aperture 112 and thus into the circulatory system.

Adjustment valve 108 includes a valve body 122 which has a neck 124 at one end. The neck contains a passage 126 and valve seat 128. At the other end of the body 122, there is located a threaded shank 130 with a threaded adjustment knob 132 threadedly mounted thereon. A rod 134 is mounted in the threaded shank 130 and extends into body 132. A ball 136 sealingly engages the seat 128. Ball 136 is held in position by an adjustment valve spring 138 which contacts rod 134. An outlet port 140 connects with the interior of body 132, and port 140 is connected to reservoir tank 102 through conventional piping.

Collapsible container support 32 includes a floor 142 which is fixed to the base. The floor has a base portion 144 which has a nipple aperture 145 adjacent to one edge. Base portion 144 is hingedly connected to the floor through a hinge 146. A second hinge 148 connects a front panel 150 to the base portion 144. A side panel 152 is connected to the front panel 150 by hinge 154 and an end panel 156 is connected to side panel 152 by a hinge 158. A second side panel 160 is connected to end panel 158 by hinge 162. The second side panel 160 has an end lock 164 which locks into front panel 150. The front panel has a hose rack mounted thereon which hose rack includes four identical ears 166 for releasably receiving and holding a hose of the spraying assembly as shown in FIG. 3.

Container 34 is a vessel for holding liquid material to be sprayed and includes a flexible plastic bag 168 which is made of a suitable material with a valve 170 mounted in the bottom thereof. Valve 170 includes a tubular housing 172 which has a plurality of exit ports 174 contained therein which open into an axial passage 176. An outlet nipple 177 is fixed in passage 176 of housing 172 with one end of the nipple forming a valve seat 178. Housing 172 is sealingly secured to the plastic container by a conventional sealing assembly 180. A valve tube 182 is threadedly mounted in housing 172 and extends outwardly of the container has may be seen in FIG. 4. A cylindrical valve body 184 is movably mounted in housing 172 and is sealingly engageable with the valve seat 178 to control the flow of liquid material into the nipple. A valve stem 186 is connected to the body 184 and extends outwardly of tube 182. The valve stem 186 includes a hook 188 for hooking the stem 186 in an extended position to hold selectively valve body 184 from having sealing engagement with the valve seat 178.

Inlet port 86 of the diaphragm pump is connected to nipple 177 through an enlarged nipple receptacle 192 which is connected to inlet 86 through a piping assembly 194 so that a liquid material may flow from the liquid container into chamber 70. Outlet port 92 of chamber 70 is connected to spraying assembly 30. The spraying assembly includes conventional valving 196. One end of a hose 198 is connected to valving 196 and a conventional spray gun 200 is mounted on the other end of the hose.

The apparatus 20 is used in the following manner. When container support 32 is in its collapsed attitude as shown in FIG. 3, the apparatus takes up very little space and may be easily stored for conveyance in an automobile, truck, station wagon or other similar conveyance. Inasmuch as the apparatus is on wheels, it may be freely moved from point to point. When the apparatus is to be placed into operation, the container support is quickly erected, simply by folding the base portion downward and extending the sides to form a square. The apparatus is then ready to receive a container. The container is dropped into the container support with the nipple 177 of the valve extending through nipple aperture 145 for positioning in receptacle 192. The valve body 184 is held into engagement with the valve seat so there is no flow of liquid out of the container. When it is necessary to have a flow, the stem 186 is raised so that hook 188 may be hooked over the top of tube 182 and thus hold the valve body away from the valve seat to allow liquid to flow into nipple 177.

The diaphragm pump is driven by electric motor 44 which drives cam 60 through belts 54. As piston 96 is pushed forward, the piston pushes liquid material out through outlet port 92. The liquid material which in this instance is paint but the apparatus may be used to spray any mixture of other liquids. The inward movement of the pump piston also pushes the pump liquid which, in this instance, is oil out of chamber 68 through outlet port 76 and through valve 108. By adjusting valve 108, the pressure in the chamber 68 may be regulated and thereby also regulate the pressure of the paint being pumped out of the chamber 70. When the pump piston 96 reaches the end of its stroke, as it is returned, spring 90 pushes on the diaphragm valve to have plate 80 close off central passage 72. Paint is drawn into chamber 70 and the retraction of the piston pulls oil from the reservoir. Thus, the reciprocation of the pump delivers paint under pressure to spraying assembly 34.

It is important to note that the paint is not always sprayed continuously. Often, an operator will interrupt the spraying for any number of reasons, but the pump will continue to operate so that the oil is being pumped by the piston but no paint is being expelled from the pump. In the event that the paint is not being sprayed, a situation is achieved wherein chamber 70 is filled with paint and plate 80 is positioned against surface 78. As the piston moves toward plate 80, the pressure is greatly increased in view of the fact that the oil is pushed out through valve 108 and back into the reservoir. However, when the piston moves away from plate 80, the plate 80 is static and there is a sharp decrease in pressure in chamber 68. At this point the force of spring 120 in valve 106 is overcomed to allow a small quantity of air to enter the system. This small quantity of air allows the oil to have resilience so that there is less oil being churned through the pump. The air in the oil reduces the load on the motor and reduces overheating of the oil.

It may also be readily appreciated that paints being sprayed may be changed quite readily. For instance, if the apparatus is being used to supply white paint and then it is necessary to supply red paint, the container of white paint may be closed simply by releasing the valve body and the lifting of the container out of the container support. A container of red paint then may be slipped into the container support. The pump and hose may be purged as is conventional and the operator may then paint with a red paint.

Once the painting operation is complete, it is a simple matter to remove the container of paint as described, fold up container support and position it in its stored attitude as shown in FIG. 3. The present apparatus has a low profile by virtue of the capability of collapsing the container support and the pistoning of the reservoir tank around the piston cylinder.

Although a specific embodiment of the herein disclosed invention has been described in detail above, and shown in the accompanying drawings, it is to be expressly understood that those skilled in the art may make various modifications and changes in the invention without departing from the spirit and scope thereof. It is to be expressly understood that the instant invention is limited only by the appended claims.

What is claimed is:

1. An apparatus for delivering a liquid matieral under pressure comprising: a base; a source of mechanical energy mounted on said base; a diaphragm pump mounted on the said base and being drivingly connected to said source of mechanical energy, said diaphragm pump including, an annular reservoir tank for holding a pump liquid, said annular reservoir tank having a central open portion, a pump cylinder positioned in the central open portion of the annular reservoir tank, and a pump piston movably mounted in the pump cylinder for pumping the pump liquid; a circulatory system connected to the pump cylinder and to the reservoir tank for carrying circulating pump liquid between said cylinder and said tank; an air check valve connected to the circulatory system to allow air to be pulled into the circulatory system; a foldable container support mounted on the base; and a liquid material container removably mounted in the container support, said container being releasably connected to the diaphragm pump, said container including a valve seat mounted at the bottom of the container, a valve body removably engageable with the valve seat for control of flow of liquid material from the container, and a valve stem connected to the body and extending exteriorly of the container to operate the valve body.

2. An apparatus for delivering a liquid material under pressure as defined in claim 1 wherein the circulatory system includes an adjustment valve to regulate the output pressure of the pump liquid from the pump cylinder.

3. An apparatus for delivering a liquid material under pressure as defined in claim 1 including, a nipple connected to the bottom of the valve seat, and a nipple receptacle connected to the inlet of the diaphragm pump for delivering liquid material to the diaphragm pump, said nipple receptacle removably receiving the nipple.

4. An apparatus for delivering a liquid material under pressure as defined in claim 1 including a hose rack mounted on the container support for releasably receiving and holding a flexible hose.

5. An apparatus for delivering a liquid material under pressure as defined in claim 1 wherein the foldable container support includes; a base portion hingedly connected to the base, a first side wall hingedly connected to the base portion, a second side wall hingedly connected to the first side wall, a third side wall hingedly connected to one of said side walls, and a fourth side wall hingedly connected to one of the other side walls, said base portion having a width substantially equal to the combined thickness of said four side walls, whereby folding of the four side walls together and folding the walls relative to the base portion allows the four side walls to be placed in the attitude substantially parallel to the base.

6. An apparatus for delivering a liquid material under pressure as defined in claim 1 wherein the circulatory system includes an adjustment valve to regulate the output pressure of the pump liquid from the pump cylinder, and including a valve tube connected to the valve seat, said valve tube extending exteriorly of the container and movably receiving the valve stem therein.

7. An apparatus for delivering a liquid material under pressure as defined in claim 1 including; a nipple connected to the bottom of the valve seat, a nipple receptacle connected to the inlet of the diaphragm pump for delivering liquid material to the diaphragm pump, said nipple receptacle removably receiving the nipple, and an adjustment valve connected to the pump cylinder to regulate the output pressure of the pump liquid from the pump cylinder.

8. An apparatus for delivering a liquid material under pressure as defined in claim 1 including; a hose rack mounted on the container support for releasably receiving and holding a flexible hose, and an adjustment valve connected to the pump cylinder to regulate the output pressure of the pump liquid from the pump cylinder.

9. An apparatus for delivering liquid material under pressure as defined in claim 1 including; a valve tube connected to the valve seat, said valve tube extending exteriorly of the container and movably receiving the valve stem therein, a nipple connected to the valve seat, a nipple receptacle connected to the diaphragm pump for delivering liquid material to the diaphragm pump, said nipple receptacle removably receiving the nipple, and a valve tube connected to the valve seat, said valve tube extending exteriorly of the container and movably receiving the valve stem therein.

10. An apparatus for delivering a liquid material under pressure as defined in claim 1 including; a valve tube connected to the valve seat, said valve tube extending exteriorly of the container and movably receiving the valve stem therein, and a hose rack mounted on the container support for releasably holding a flexible hose.

11. An apparatus for delivering a liquid material under pressure as defined in claim 1 wherein the container support includes; a base portion hingedly connected to the base, a first side wall hingedly connected to the base portion, a second side wall hingedly connected to the first side wall, a third side wall hingedly connected to one of said side walls, and a fourth side wall hingedly connected to one of the other side walls, said base portion having a width substantially equal to the combined thicknesses of said four side walls, whereby folding of the four side walls together and folding the walls relative to the base portion allows the four side walls to be placed into an attitude substantially parallel to the base, and a hose rack mounted on one of said walls for releasably holding and receiving a flexible hose.

12. An apparatus for delivering liquid material under pressure as defined in claim 1 wherein said diaphragm pump includes a housing, a diaphragm mounted in said housing having its outer periphery sealing secured to the housing defined two chambers in said housing separated by the diaphragm with one of the chambers communicating with the cylinder, and outlet port in said housing communicating with the one chamber and with the circulatory system, and inlet port communicating with said one chamber and connected to the annular reservoir tank, and a plate mounted on said diaphragm engageable with the housing to seal a portion of said one chamber.

13. An apparatus for delivering a liquid material under pressure as defined in claim 1 including a valve tube connected to the valve seat, said valve tube extending exteriorly of the container and movably receiving the valve stem therein.

14. An apparatus for delivering a liquid material under pressure as defined in claim 2 including a stem hook connected to the valve stem and being engageable with the valve tube to hold the valve body in a raised position spaced away from the valve seat.

15. An apparatus for delivering a liquid material under pressure as defined in claim 1 wherein the foldable container support includes; a base portion hingedly connected to the base, a first side wall hingedly connected to the base portion, a second side wall hingedly connected to the first side wall, a third side wall hingedly connected to one of said side walls, and a fourth side wall hingedly connected to one of the other side walls, said base portion having a width substantially equal to the combined thickness of said four side walls, whereby folding of four side walls together and folding of the walls relative to the base portion allows the four side walls to be placed in an attitude substantially parallel to the base; a hose rack mounted on one of the side walls for releasably receiving and holding a flexible hose; the circulatory system includes an adjustment valve to regulate the output pressure of the pump liquid from the pump cylinder; and including; a nipple connected to the bottom of the valve seat, a nipple receptacle connected to the diaphragm pump for delivering liquid material to the diaphragm pump, said nipple receptacle removably receiving a nipple, a valve tube connected to the valve seat, said valve tube extending exteriorly of the container and movably receiving the valve stem therein, and a stem hook connected to the valve stem and being engageable with the upper portion of the valve tube to hold the valve body in a raised position spaced away from the valve seat.

16. An apparatus for delivering liquid material under pressure comprising; a base, a source of mechanical energy mounted on said base, a diaphragm pump mounted on said base and being drivingly connected to said source of mechanical energy for pumping the liquid material, said diaphragm pump including a reservoir tank and a cylinder having a piston reciprocably mounted therein, a circulatory system connected to the cylinder and the reservoir tank, a foldable container support hingedly mounted on the base, and a liquid material container removably mounted in the container support and being releasably connected to the diaphragm pump to provide liquid material to be pumped under pressure by the diaphragm pump.

17. An apparatus for delivering a liquid material under pressure as defined in claim 16 including an air check valve connected to the circulatory system to allow air to be introduced into the circulatory system when the liquid material is prevented from being pumped out of the pump.

18. An apparatus for delivering a liquid material under pressure as defined in claim 16 wherein the circulatory system includes an adjustment valve to regulate the output pressure of the pump liquid from the diaphragm pump.

19. An apparatus for delivering a liquid material under pressure as defined in claim 16 wherein the foldable container support includes; a base portion hingedly connected to the base, a first side wall hingedly connected to the base portion, a second side wall hingedly connected to the first side wall, a third side wall hingedly connected to one of said side walls, and a fourth side wall hingedly connected to one of the other side walls, said base portion having a width substantially equal to the combined thicknesses of said four sided walls, whereby folding of the four said side walls together and folding of the walls relative to the base portion allows the four sided walls to be placed in an attitude substantially parallel to the base.

20. An apparatus for delivering a liquid material under pressure as defined in claim 16 including; a valve seat mounted in the container, a valve body removably engageable with the valve seat for control of flow of liquid material from the container, and a valve stem connected to the body and extending exteriorly of the container to operate the valve body.

21. An apparatus for delivering a liquid material under pressure as defined in claim 20 including; a valve tube connected to the valve seat, said valve tube extending exteriorly of the container and movably receiving the valve stem therein, and a stem hook connected to the valve stem and being engageable with the valve tube to hold the valve body in a raised position spaced away from the valve stem.

22. An apparatus for delivering a liquid material under pressure as defined in claim 17 including; a nipple connected to the bottom of the valve seat, and a nipple receptacle connected to the diaphragm pump for delivering liquid material to the diaphragm pump, said nipple receptacle removably receiving the nipple.

23. A diaphragm pump for delivering liquid material under pressure comprising; a housing, a pump cylinder connected to said housing, a pump piston reciprocably mounted in said cylinder for forcing a pump liquid under pressure into said housing, a diaphragm mounted in said housing having its outer periphery sealingly secured to the housing to define two chambers in said housing separated by the diaphragm with one of the chambers communicating with the cylinder, an inlet aperture in said housing communicating with the other of said chambers to allow liquid material to enter said other chamber, a check valve connected to said inlet aperture to prevent liquid material from flowing out of the second chamber through the inlet aperture, an annular reservoir tank surrounding the cylinder and supported by said housing for holding pump liquid to be delivered to the chamber connected to the pump cylinder, said housing having an inlet port communicating with said one chamber and an outlet port communicating with said one chamber, a plate mounted on said diaphragm, said plate being engageable with a portion of the housing to close off a portion of said one chamber, and an air check valve connected to the outlet port to allow air to be drawn into the pump when liquid material is prevented from being pumped out of the other chamber.

24. A diaphragm pump for delivering a liquid material under pressure comprising; a pump housing, a pump cylinder connected to the pump housing, a pump piston reciprocably mounted in the pump cylinder, a diaphragm attached to the pump housing and being movable in said housing, a liquid material inlet aperture in said housing to allow a liquid material to enter the housing on one side of the diaphragm, a check valve in said inlet aperture to allow liquid material to enter the housing but not leave through said inlet aperture, said housing having a pump liquid outlet aperture connected to the pump cylinder on the other side of the diaphragm, and an air check valve connected to the outlet aperture to take air into the housing on the side of the diaphragm having the cylinder when the liquid material is prevented from being pumped out of the housing.

25. A diaphragm pump for delivering a liquid material under pressure as defined in claim 24 including a plate mounted on said diaphragm for engaging the housing to seal a portion of the housing.

26. A vessel for use in holding a liquid material comprising; a container having flexible walls, a valve seat mounted at the bottom of the container, a valve body removably engageable with the valve seat for control of flow of liquid material from the container, a valve tube connected to the valve seat and extending exteriorly of the container, a valve stem connected to the valve body and being movably mounted in the valve tube and extending exteriorly of the valve tube, and a nipple connected to the bottom of the valve seat for removable connected to a nipple receptacle connected to a pump.

27. A vessel for use in holding material as defined in claim 26 including a stem hook connected to the valve stem and being engageable with the upper portion of the valve tube to hold the valve body in a raised position spaced away from the valve seat.

28. An apparatus for delivering a liquid material under pressure comprising: a base; a source of mechanical energy mounted on said base; a drive assembly connected to the source of mechanical energy; a diaphragm pump mounted on said base and being drivingly connected to said source of mechanical energy by said drive assembly, said diaphragm pump including, an annular reservoir tank for holding a pump liquid, said annular reservoir tank having a central open portion, a housing, a pump cylinder connected to said housing positioned in the central open portion of the annular reservoir tank, a pump piston movably mounted in the pump cylinder and being connected to the drive assembly, a diaphragm having its outer periphery sealing secured to the housing to define two chambers in said housing separated by the diaphragm, one of the chambers communicating with the pump cylinder, an inlet aperture in said housing communicating with the other of said chambers, a check valve connected to said inlet aperture to prevent liquid material from flowing out of said other chamber through the inlet aperture, said annular reservoir tank surrounding the cylinder, said housing having an inlet port communicating with said one chamber, an outlet port communicating with said one chamber, a plate mounted on said diaphragm and engageable with a portion of the housing to close off a portion of said one chamber; a circulatory system connted to the outlet port and to the reservoir tank for carrying circulating pump liquid between said cylinder and said tank; an air check valve connected to the circulatory system to allow air to be pulled into the circulatory system; a foldable container support mounted on the base, said foldable container support including, a base portion hingedly connected to the base, a first side wall hingedly connected to the base portion, a plurality of secondary side walls hingedly connected to the first side wall, said base portion having a width substantially equal to the combined thickness of said first wall and plurality of side walls, whereby folding of the first side wall and the plurality of secondary side walls together and folding of the first side wall relative to the base portion allows the side walls to be placed in an attitude substantially parallel to the base, a hose rack mounted on one of the side walls for releasably receiving and holding a flexible hose; a liquid material container removably mounted in the container support, said container being releasably connected to the diaphragm pump, said container including, a valve seat mounted at the bottom of the container, a valve body removably engageable with the valve seat for control of flow of liquid material from the container, a valve tube connected to the valve seat, said valve tube extending exteriorly of the container, a valve stem connected to the body and extending exteriorly of the valve tube, a nipple connected to the bottom of the valve seat, and a nipple receptacle connected to the inlet aperture in the diaphragm pump housing, said nipple receptacle removably receiving the nipple.

* * * * *